(No Model.)

W. F. MODES.
REGENERATING AND REVERBERATING GLASS FURNACE.

No. 320,951. Patented June 30, 1885.

WITNESSES
A. G. Morey.
C. Kitching

INVENTOR
William F. Modes
By his Attorney
G. L. Chapin

UNITED STATES PATENT OFFICE.

WILLIAM F. MODES, OF STREATOR, ILLINOIS.

REGENERATING AND REVERBERATING GLASS-FURNACE.

SPECIFICATION forming part of Letters Patent No. 320,951, dated June 30, 1885.

Application filed April 16, 1885. (No model.)

*To all whom it may concern:*

Be it known that I, WILLIAM F. MODES, a citizen of the United States, and a resident of Streator, LaSalle county, State of Illinois, have invented new and useful Improvements in Regenerating and Reverberating Glass-Melting Furnaces, of which the following is a specification, reference being had to the accompanying drawings, illustrating the invention, in the several figures of which like letters and figures indicate like parts.

The purpose of the present invention is to combine such additional mechanism with the heating portion of the regenerating glass-furnace patented to me on October 7, 1884, as will better serve the purpose of melting the material for glass, purifying the molten glass till taken up by the blower-pipes, insulating certain parts which would otherwise be melted, and providing better means for the support of the bottom of the tank.

Embodied in these improvements are pots which are floated on the molten glass, and in which the material to make the glass is melted by jets of gas-flame from the furnace, the sides of the pots being slotted down to near their bottoms for the molten glass to run out; a division-wall or partition between the charging and gathering ends of the tank, and combining the partition with a siphon for conducting the glass to a skimmer-pot and from that into the gathering end of the main tank; the combination of the batch-pots with gas-jets, and the combination of gas-jets with the skimmer-pot and gathering-chamber; further, in the construction of the tank and supporting its bottom sections, as the whole is hereinafter fully described and shown.

Figure 1:
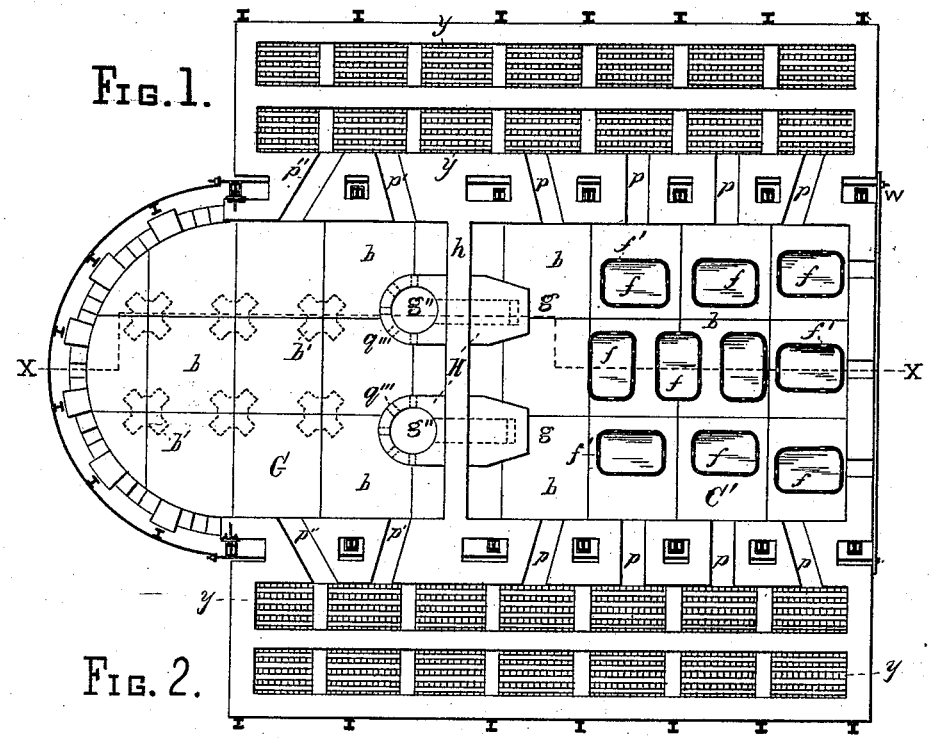
Figure 2:
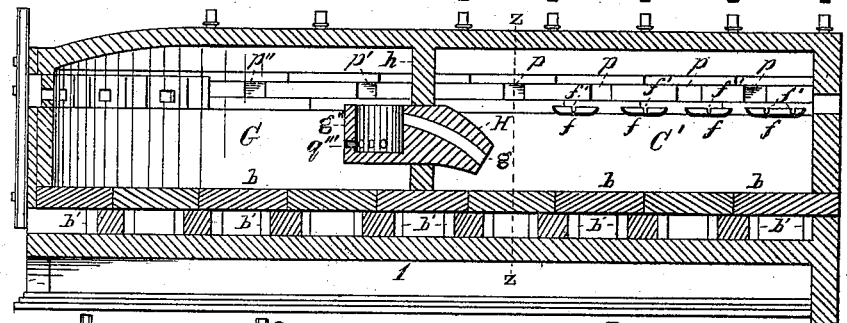
Figure 3:
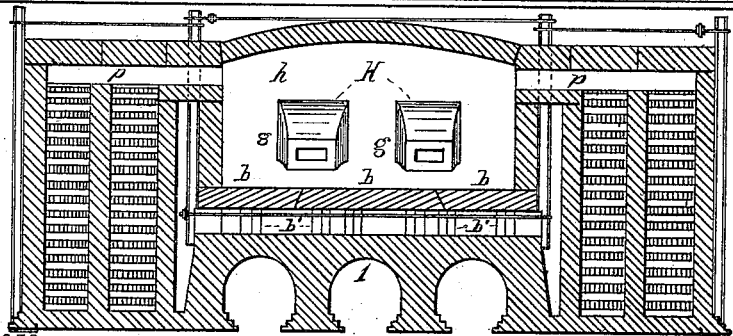

In the drawings, Figure 1 is a plan view of a glass-furnace embodying my improvements. Fig. 2 is a longitudinal central sectional elevation of Fig. 1 on line X. Fig. 3 is a cross-sectional elevation of Fig. 2 on line Z.

The construction of the furnace is as follows: $l$ represents an ordinary substantial foundation for the support of the two-part tank G C'. The blocks of fire-clay forming the bottom of the tank are shown at $b\ b$, &c. It has been the custom to support the corners of these blocks by rectangular supports whose horizontal planes have been set diagonally to the rectangular planes of the blocks; but it is found that such square supports, unless so large as to be objectionable for several reasons, do not project under the section far enough to prevent the weight on the sections from breaking off the corners of the blocks. I obviate this difficulty by the use of four-winged supports $b'$, the wings being long enough to form suitable supports for the corners of the blocks $b$, but not thick enough so to change the temperature of the blocks as to cause them to crack.

Constructed across this tank G C' is a partition, $h$, of fire-clay or other suitable material, and connected with this partition is a body of fire-clay, H, in which is formed a siphon, $g$, and a skimmer-pot, $g''$, and at the bottom of the skimmer-pot are formed a series of holes, $q'''$, that there may be a free passage of the molten glass from chamber C' to chamber G.

It is well known that the heavier glass settles to the bottom of the tank, and it is obvious that if molten glass in chamber C' be kept above the siphon $g$ the glass will seek its common level in chamber G. The crucibles are shown at $f\ f$, &c., and they are made of fire-clay or other suitable material, and in practice they each may be about forty inches long, two feet wide, and six inches deep, and one or more slots, $f'$, must be formed in their sides or ends, or both, down to near their bottoms, for the escape of molten glass into the tank C'. In practice these crucibles are to float on the molten glass and contain the material of which the glass is made. This can be done, inasmuch as the raw material is lighter than the melted glass.

By reference to Fig. 1 it will be seen that the tank G C' is located between the checker gas-passages $y\ y$, which are mentioned in the aforementioned patent. The flues $p\ p\ p\ p$ on both sides of that part of the tank shown at C' lead from the gas-passages to the tank, and the outer ones are inclined inward, so as to keep the intense heat away from the end of the tank and bridge-wall $h$. The flues $p'\ p'$ are inclined so as to direct the gas onto the skimmer-pot $g''$, and the flues $p''$ are inclined so as to direct the flame to the middle portion, G, of the tank. It will also be observed that two skimmer-pots are employed in the one bridge-wall $h$. This is for the better purification of the glass, and a construction adapted for the wider tanks. Between the checker-work and the tank, on each side thereof, is placed an air-flue, W, which communicates with cold air to keep the sides of the tank the required temperature.

The operation is as follows: The gas is generated by the furnace, as shown and described in the aforementioned patent, and is let onto the crucibles $f$ after they have been charged and anchored by rods, so as to be held in suitable position. When the crucibles are to be recharged, the gas is shut off. The charging of the crucibles will be done so often as to keep the tank supplied with molten glass. By this means glass of better quality is made from the same material, and the apparatus is worked to a better advantage and at less expense than the furnaces heretofore in use, and the glass will be evener, because better means are provided for purifying it.

I claim and desire to secure by Letters Patent—

1. The floating-batch crucibles $f$ $f$ $f$, &c., constructed with slots $f'$ in their sides for the molten glass to escape into the tank, as and for the purpose specified.

2. The bridge-wall $h$, combined with one or more siphons, $g$, for the glass to enter the gathering end of the tank from the charging end, as specified.

3. The bridge-wall $h$, combined with one or more siphons, $g$, and one or more skimmer-pots, $g''$, as and for the purpose specified.

4. One or more skimmer-pots combined with a bridge-wall, $h$, of a glass-furnace, the said pots having one or more openings for glass to pass into the gathering-chamber, as specified and shown.

5. The combination of the checker-work $y$ $y$, with the tank G C', crucibles $f$ $f$ $f$, &c., and gas-flues $p$ $p'$ $p''$, formed in the side wall to the tank, as set forth, and for directing the gas-flame, as specified.

6. The combination of the four-armed supports $b'$, with the blocks $b$, forming the bottom of the tank, as specified.

W. F. MODES.

Witnesses:
ANDREW HILLENBRAND,
GEO. F. BELFORD.